United States Patent
Juenger et al.

(10) Patent No.: US 10,394,310 B2
(45) Date of Patent: Aug. 27, 2019

(54) SYSTEM AND METHOD FOR SLEEPING STATES USING NON-VOLATILE MEMORY COMPONENTS

(71) Applicant: DELL PRODUCTS, LP, Round Rock, TX (US)

(72) Inventors: Randall E. Juenger, Belton, TX (US); Mark L. Rehmann, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 73 days.

(21) Appl. No.: 15/173,873

(22) Filed: Jun. 6, 2016

(65) Prior Publication Data
US 2017/0351616 A1 Dec. 7, 2017

(51) Int. Cl.
| | | |
|---|---|---|
| *G06F 12/08* | (2016.01) | |
| *G06F 1/329* | (2019.01) | |
| *G06F 12/0804* | (2016.01) | |
| *G06F 12/0895* | (2016.01) | |
| *G06F 1/3234* | (2019.01) | |
| *G06F 9/4401* | (2018.01) | |

(52) U.S. Cl.
CPC ............ *G06F 1/329* (2013.01); *G06F 1/3275* (2013.01); *G06F 9/4418* (2013.01); *G06F 12/0804* (2013.01); *G06F 12/0895* (2013.01); *G06F 2212/202* (2013.01); *G06F 2212/60* (2013.01); *Y02D 10/14* (2018.01); *Y02D 50/20* (2018.01)

(58) Field of Classification Search
CPC .... G06F 12/0804; G06F 12/0868; G06F 1/30; G06F 12/0833; G06F 2212/222; G06F 2212/62; G06F 2212/7209; G06F 12/12; G06F 12/00; G06F 12/02; G06F 1/329; Y02D 10/14; Y02D 50/20
USPC ......................................................... 711/103
See application file for complete search history.

(56) References Cited

U.S. PATENT DOCUMENTS

| | | | | |
|---|---|---|---|---|
| 5,519,831 | A * | 5/1996 | Holzhammer | G06F 11/1441 365/228 |
| 7,039,755 | B1 * | 5/2006 | Helms | G11C 11/406 365/222 |
| 7,158,900 | B2 * | 1/2007 | McNutt | G05B 11/28 702/73 |
| 7,587,618 | B2 * | 9/2009 | Inui | G06F 1/3203 713/320 |
| 8,438,328 | B2 | 5/2013 | Smith et al. | |
| 8,615,678 | B1 * | 12/2013 | Madnani | G06F 11/1666 714/47.1 |
| 2005/0071692 | A1 * | 3/2005 | Chaiken | G06F 9/4418 713/300 |
| 2006/0047984 | A1 * | 3/2006 | Ho | G06F 1/3203 713/300 |

(Continued)

*Primary Examiner* — Mano Padmanabhan
*Assistant Examiner* — Jean C Edouard
(74) *Attorney, Agent, or Firm* — Larson Newman, LLP (57) ABSTRACT

Sleep modes use non-volatile dual inline memory modules (NVDIMMs) to reduce electrical power and execution times. An S3 suspend-to-RAM, for example, may store a system state to NVDIMM via a high-speed memory bus. Likewise, an S4 suspend-to-disk may store a restoration file to the NVDIMM via the high-speed memory bus. When a server or other information handling system is then awakened, execution resumes in less time due to the NVDIMM.

20 Claims, 5 Drawing Sheets

(56) References Cited

U.S. PATENT DOCUMENTS

| | | | |
|---|---|---|---|
| 2006/0184736 A1* | 8/2006 | Benhase | G06F 11/1441 711/118 |
| 2009/0119527 A1* | 5/2009 | Kim | G06F 1/30 713/323 |
| 2009/0172204 A1* | 7/2009 | Igari | G06F 1/3228 710/5 |
| 2009/0219760 A1* | 9/2009 | Arya | G11C 16/10 365/185.08 |
| 2010/0064151 A1* | 3/2010 | Saeki | G06F 1/3203 713/300 |
| 2010/0180065 A1* | 7/2010 | Cherian | G06F 12/0804 711/103 |
| 2010/0332708 A1* | 12/2010 | Kuwahara | G06F 1/3203 710/107 |
| 2011/0010499 A1* | 1/2011 | Tsukamoto | G06F 11/1441 711/118 |
| 2011/0113208 A1* | 5/2011 | Jouppi | G06F 11/1438 711/162 |
| 2011/0289263 A1* | 11/2011 | McWilliams | G06F 12/0284 711/103 |
| 2012/0254636 A1* | 10/2012 | Tsukamoto | G06F 1/30 713/300 |
| 2012/0297147 A1* | 11/2012 | Mylly | G06F 12/0246 711/143 |
| 2013/0191578 A1* | 7/2013 | Goss | G06F 12/0804 711/102 |
| 2013/0283079 A1* | 10/2013 | Puthiyedath | G06F 1/3234 713/323 |
| 2014/0095769 A1* | 4/2014 | Borkenhagen | G11C 5/04 711/103 |
| 2014/0164804 A1 | 6/2014 | Isci et al. | |
| 2014/0189198 A1* | 7/2014 | Siddiqi | G06F 12/0246 711/103 |
| 2014/0215277 A1* | 7/2014 | Judd | G06F 11/2284 714/42 |
| 2014/0245294 A1* | 8/2014 | Kaul | G06F 9/45558 718/1 |
| 2015/0006871 A1* | 1/2015 | Nachimuthu | G06F 12/1408 713/2 |
| 2015/0261672 A1* | 9/2015 | Nguyen | G11C 14/0018 711/118 |
| 2015/0277542 A1* | 10/2015 | Chinnakkonda Vidyapoornachary | G06F 1/3275 713/323 |
| 2016/0170685 A1* | 6/2016 | Chakkravarthy | G06F 3/0689 711/114 |
| 2016/0170897 A1* | 6/2016 | Solihin | G06F 12/1009 711/207 |
| 2016/0188414 A1* | 6/2016 | Jayakumar | G06F 1/30 711/103 |
| 2016/0202936 A1* | 7/2016 | Lesartre | G06F 12/08 711/133 |

* cited by examiner

SYSTEM AND METHOD FOR SLEEPING STATES USING NON-VOLATILE MEMORY COMPONENTS

FIELD OF THE DISCLOSURE

The present disclosure generally relates to information handling systems, and more particularly relates to sleeping states using non-volatile memory components.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Sleep modes use non-volatile dual inline memory modules (NVDIMMs) to reduce electrical power and execution times. Whenever a server or other information handling system enters a sleep state, various hardware and/or software features power down to conserve energy. An S3 suspend-to-RAM, for example, may store a system state to NVDIMM via a high-speed memory bus. Likewise, an S4 suspend-to-disk may store a restoration file to the NVDIMM via the high-speed memory bus. When a server or other information handling system is then awakened, execution resumes in less time due to the NVDIMM. Indeed, exemplary embodiments may be applied to any sleeping state (e.g., S1-S4) for quicker resumption.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
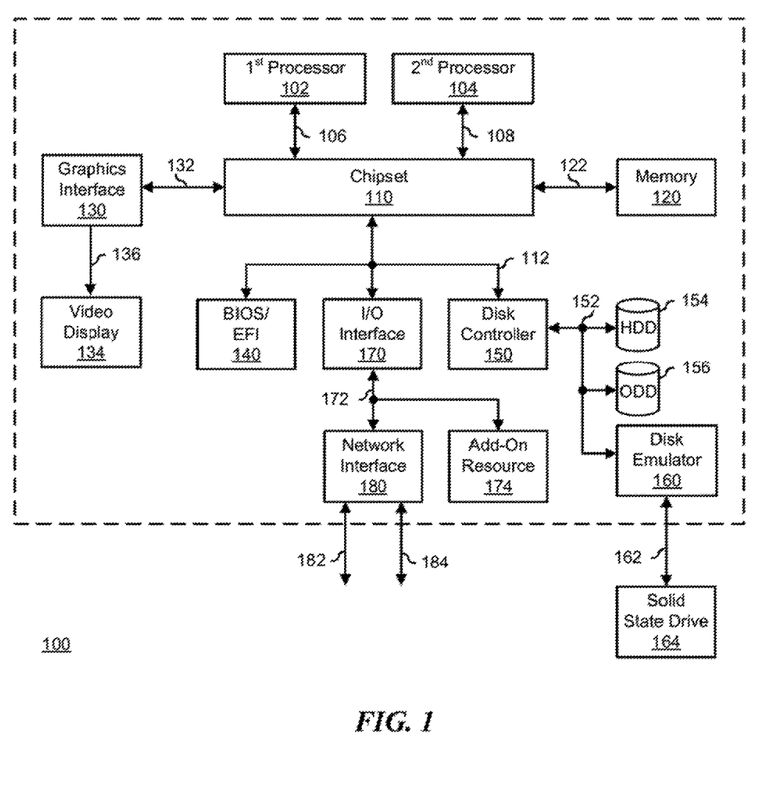
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
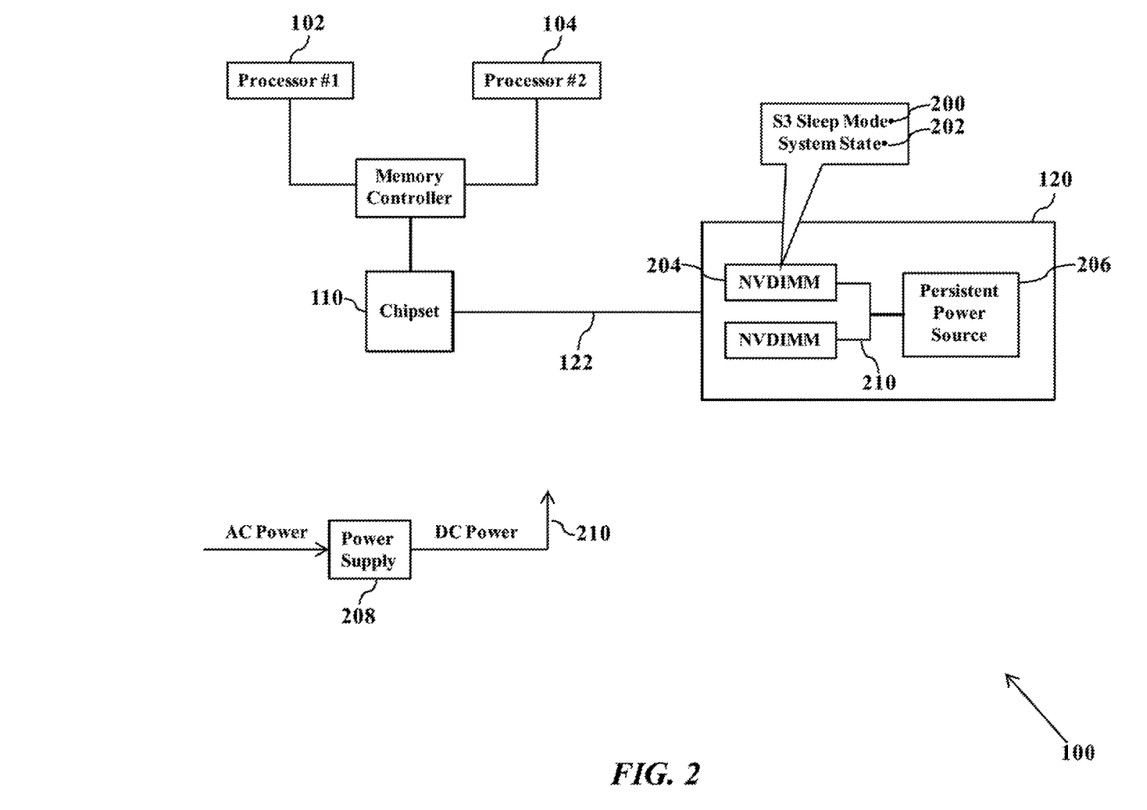
FIG. 2 illustrates S3 suspension, according to exemplary embodiments.

FIG. 2 illustrates S3 suspension, according to exemplary embodiments. Here the information handling system 100 utilizes non-volatile memory components to support sleep or suspend modes of operation. Many computers, servers, smartphones, and mobile devices have various sleep modes. These sleep modes reduce consumption of electrical power during periods of inactivity. The information handling system 100 may then be awakened or resumed when activity increases. For example, various energy saver modes have been used, such as stand by, sleep, suspend, and hibernate. These energy saver modes are governed by the Advanced Configuration and Power Interface (ACPI) specification, which defines several states known as S1, S2, S3, and S4.

For example, an "S3 sleep mode" 200 preserves a system state 202 in Non-Volatile Dual In-line Memory Modules (NVDIMM) 204. The NVDIMM 204 may be a component of the memory 120 of the information handling system 100. The NVDIMM 204 may thus communicate with the processors 102 and 104 via the memory bus 122. The NVDIMM 204 is a nonvolatile memory solution that combines NAND flash, DRAM, and/or a backup or auxiliary power source 206 (such as capacitors). For simplicity, FIG. 2 only illustrates two (2) NVDIMM modules. In practice, though, exemplary embodiments may utilize many NVDIMM modules according to needs or design. Whenever the S3 sleep mode 200 is selected or entered, exemplary embodiments may store the corresponding system state 202 in any one or more of the NVDIMMs 204. The NVDIMM 204 is always available for storage functions, even when a power supply 208 is turned off or otherwise inoperative (failed). That is, the NVDIMM 204 may receive electrical power 210, whether provided by a rail of the power supply 208 and/or by the auxiliary power source 206. The NVDIMM 204 may persistently store the system state 202 while sleeping. When the information handling system 100 is awakened or refreshed, the information handling system 100 quickly retrieves the architectural system state 202 and resumes execution from the last point before the S3 suspension.

Figure 3:
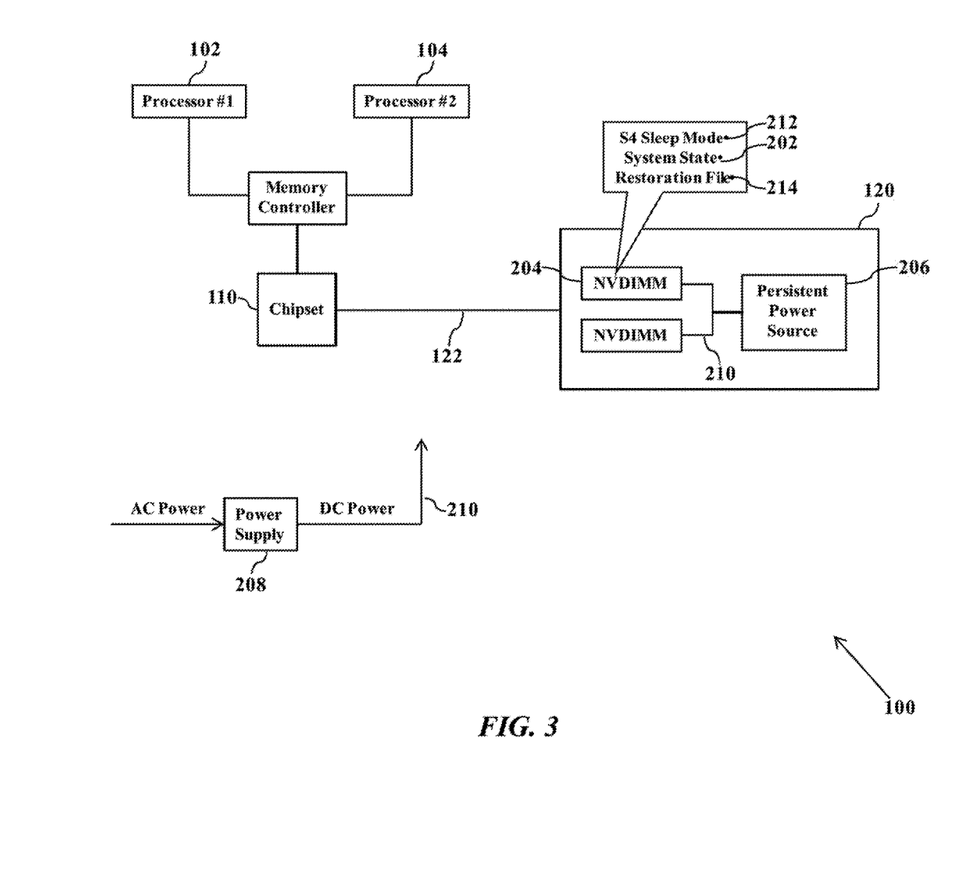
FIG. 3 illustrates S4 suspension, according to exemplary embodiments.

FIG. 3 illustrates S4 suspension, according to exemplary embodiments. Here exemplary embodiments may utilize the Non-Volatile Dual In-line Memory Modules (NVDIMM) 204 for an "S4 sleep mode" 212. Whenever the S4 sleep mode 212 is selected or entered, the corresponding system state 202 is stored as an electronic restoration file 214. Conventional S4 suspension would ordinarily store the restoration file 214 to the hard disk drive 154 (illustrated in FIG. 1). Here, though, exemplary embodiments may store the electronic restoration file 214 in one or more of the NVDIMMs 204. The NVDIMM 204 is substantially faster than conventional hard disk drives. Because the NVDIMM 204 is alive (via the electrical power 210 provided by the power supply 208 and/or by the auxiliary power source 206), the restoration file 214 may be quickly retrieved for resumption upon awakening or power on.

Exemplary embodiments are especially desirable for large-scale computing environments. Server farms for cloud computing can consume large amounts of electrical power, so smart energy utilization is important for cost control. Exemplary embodiments thus allow these large-scale computing environments to quickly sleep machines that are not currently being utilized, but the sleeping machines may then be quickly awakened when demand requires. Indeed, even seconds or a minute may prove an advantage for response times and energy consumption.

Exemplary embodiments also reduce maintenance times. When a server requires maintenance, sometimes the server must be shut down. Exemplary embodiments allow an administrator to put the server in either the S3 sleep mode 200 or the S4 sleep mode 212 for quick suspension. Once the maintenance is completed, the server may then quickly resume operation (via the NVDIMM 204), thus saving precious seconds or even minutes. When the reader understands that a typical server farm may have hundreds or even thousands of servers, the time savings can be substantial.

Exemplary embodiments are applicable to any state. For example, in the S1 system power state, a processor clock is off and bus clocks are stopped. When operation is resumed, any software resumes from the point of S1 initialization, and any hardware latency is less than two (2) seconds. In the S2 system power state, here the processors 102 and 104 are turned off, bus clocks are stopped, and some buses may lose power. After wake up, control resumes from the processor's reset vector.

Figure 4:
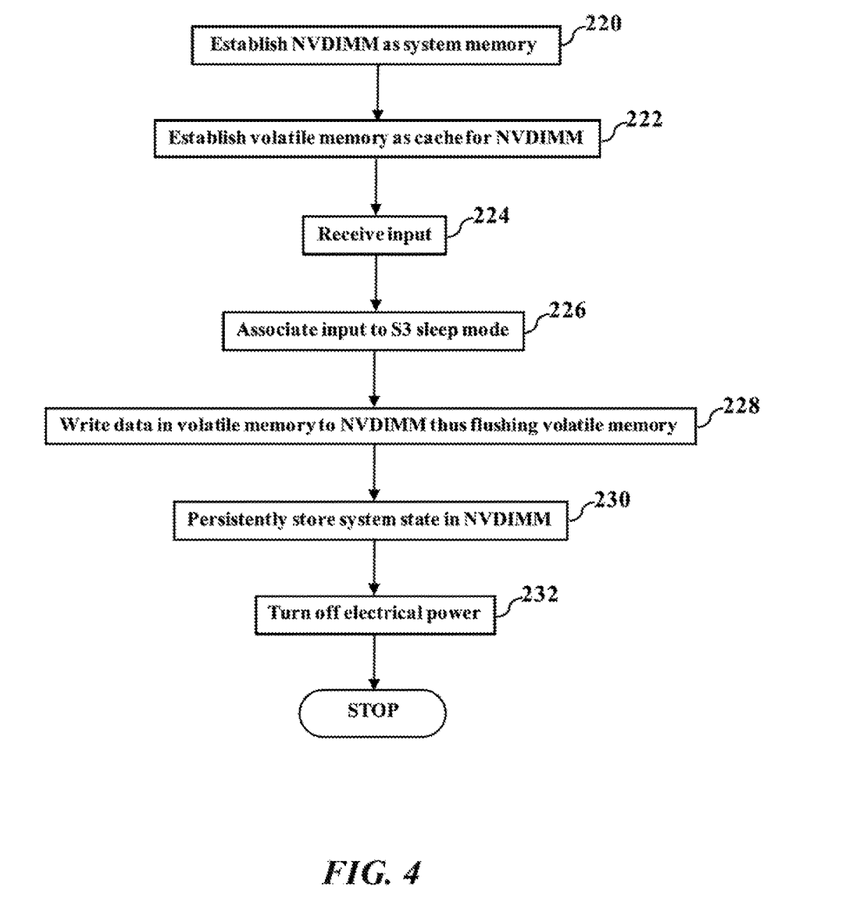
FIG. 4 is a flowchart illustrating S3 suspension, according to exemplary embodiments.

FIG. 4 is a flowchart illustrating S3 suspension, according to exemplary embodiments. Here the NVDIMM 204 operates as the system memory 120 (illustrated in FIG. 1) (Block 220). Any volatile memory (such as RAM or double data rate DDR4 DIMM) may be cache memory for the NVDIMM 204 (Block 222). An input is received (Block 224), such as depression of a key on a keyboard or selection of an icon on a capacitive touchscreen. The input is associated with a request for the S3 sleep mode 200 (such as suspend to RAM) (Block 226). Any information or data stored in the volatile memory may be moved or written to the NVDIMM 204 (Block 228) in response to the input requesting the S3 sleep mode 200, thus flushing (such as clear or erase) the volatile cache memory. However, because the NVDIMM 204 is persistent storage, the system state 202 is maintained (Block 230), thus allowing the alternating current electrical power 210 supplied by the power supply 208 to be terminated or removed (Block 232) to reduce energy consumption.

The S3 sleep mode 200 saves electrical power. The time to resume is comparable to conventional S3 implementations with only DDR4, as the system state 202 or context never moves across the I/O interface 170 (illustrated in FIG. 1). The system state 202, in other words, is bounded within the memory 120. Exemplary embodiments thus advantageously write data or information to the NVDIMM 204 to eliminate the need for a high current standby rail to maintain the electrical power 210 to the DDR4 DIMMs, thus saving cost and complexity for independent supply rails.

Figure 5:
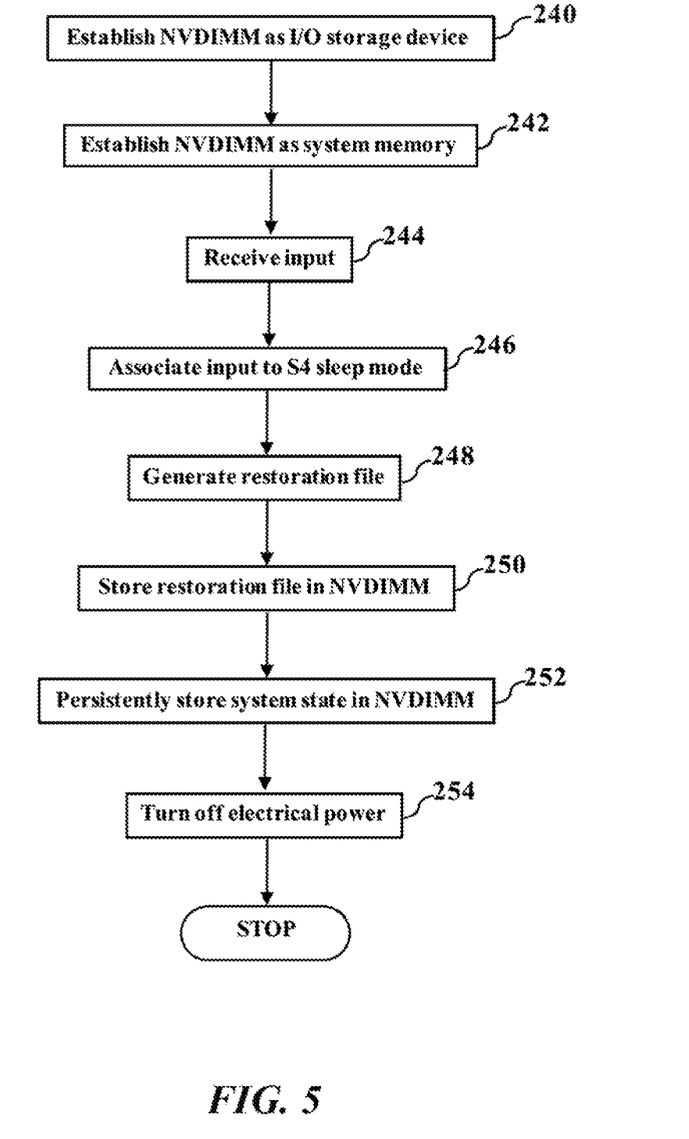
FIG. 5 is a flowchart illustrating S4 suspension, according to exemplary embodiments.

FIG. 5 is a flowchart illustrating S4 suspension, according to exemplary embodiments. Here the NVDIMM 204 is established or initialized to operate as an I/O storage device to store blocks of data via the memory bus 122 (illustrated in FIG. 1) (Block 240). The NVDIMM 204 may also operate as the system memory 120 (illustrated in FIG. 1) (Block 242). When the input is received (Block 244) (again, such as depression of a different key or selection of a different icon), the input is associated with a request for the S4 sleep mode 212 (such as suspend to disk) (Block 246). The electronic restoration file 214 is generated in a cache memory in response to the input (Block 248) and stored to the NVDIMM 204 via the memory bus 122 (Block 250). However, because the NVDIMM 204 is persistent storage, the restoration file 214 preserves the system state 202 (Block 252), thus allowing the alternating current electrical power 210 supplied by the power supply 208 to be terminated or removed (Block 254) to reduce energy consumption.

Exemplary embodiments may thus operationally treat the NVDIMM 204 as a hard disk or solid state drive or volume. The S4 sleep mode 212 may thus be implemented similar a write to HDD/SSD, yet exemplary embodiments are faster, as the system state 202 or context never moves across the I/O interface 170 (illustrated in FIG. 1). Exemplary embodiments thus decline to use the slower I/O interface 170 when executing the I/O interface 170. The S4 sleep mode 212 may require that the NVDIMM 204 functionally operate as a boot volume. However, if the NVDIMM 204 is not the boot device, an operating system may need to be modified to move the system state 202 or context to the NVDIMM 204.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a processor; and a memory device, the memory device storing code, the code when executed causing the processor to perform operations, the operations including:
  establishing a cache memory as a system memory coupled to the processor, the cache memory implemented as a non-volatile dual inline memory module;
  receiving an S4 input associated with a request to sleep operation;
  generating a restoration file in the cache memory in response to the S4 input associated with the request to sleep operation; and
  terminating electrical power supplied to the cache memory after the restoration file is generated in the cache memory.

2. The information handling system of claim 1, wherein the operations further comprise operating the cache memory as a boot volume.

3. The information handling system of claim 1, wherein the operations further comprise establishing communication via a bus between the processor and the non-volatile dual inline memory module.

4. The information handling system of claim 1, wherein the operations further comprise establishing communication via a bus between the processor and the cache memory.

5. The information handling system of claim 1, wherein the operations further comprise operating the cache memory as an input/output device.

6. The information handling system of claim 1, wherein the operations further comprise terminating the electrical power to the non-volatile dual inline memory module.

7. The information handling system of claim 1, wherein the operations further comprise establishing volatile memory as the cache memory for the non-volatile dual inline memory module.

8. A method, comprising:
  establishing, by a processor of an information handling system, a cache memory as a system memory coupled to the processor, the cache memory implemented as a non-volatile dual inline memory module;
  receiving an S4 input associated with a request to sleep operation;
  generating a restoration file in the cache memory in response to the S4 input associated with the request to sleep operation; and
  terminating, by the information handling system, electrical power supplied to the cache memory after the restoration file is generated in the cache memory.

9. The method of claim 8, further comprising operating the cache memory as a boot volume.

10. The method of claim 8, further comprising establishing communication via a bus between the processor and the non-volatile dual inline memory module.

11. The method of claim 8, further comprising establishing communication via a bus between the processor and the cache memory.

12. The method of claim 8, further comprising operating the cache memory as an input/output device.

13. The method of claim 8, further comprising terminating the electrical power to the non-volatile dual inline memory module.

14. The method of claim 8, further comprising establishing volatile memory as the cache memory for the non-volatile dual inline memory module.

15. An information handling system, comprising:
  a processor; and
  a system memory device coupled to the processor, the system memory device storing code, the code when executed causing the processor to perform operations, the operations including:
    establishing a non-volatile dual inline memory module as an input/output device via a memory bus;
    receiving an S4 input associated with a request to sleep operation;
    generating an electronic restoration file in a cache memory portion of the system memory device, the electronic restoration file associated with a system state in response to the S4 input associated with the request to sleep operation; and
    terminating electrical power supplied to the non-volatile dual inline memory module after the generating of the electronic restoration file in the cache memory.

16. The information handling system of claim 15, wherein the operations further comprise establishing communication between the processor and the non-volatile dual inline memory module.

17. The information handling system of claim 15, wherein the operations further comprise establishing cache memory for the non-volatile dual inline memory module.

18. The information handling system of claim 17, wherein the operations further comprise establishing communication via the memory bus between the processor and the cache memory.

19. The information handling system of claim 17, wherein the operations further comprise establishing volatile memory as the cache memory for the non-volatile dual inline memory module.

20. The information handling system of claim 15, wherein the operations further comprise booting from the non-volatile dual inline memory module.

* * * * *